(12) United States Patent
Ninan (10) Patent No.: US 7,506,336 B1
(45) Date of Patent: Mar. 17, 2009

(54) SYSTEM AND METHODS FOR VERSION COMPATIBILITY CHECKING

(75) Inventor: Anoop George Ninan, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 693 days.

(21) Appl. No.: 11/170,026

(22) Filed: Jun. 29, 2005

(51) Int. Cl.
*G06F 9/445* (2006.01)
(52) U.S. Cl. .................. 717/175; 717/169; 717/121; 717/170; 707/203
(58) Field of Classification Search .......... 717/168, 717/170, 169, 121; 707/203
See application file for complete search history.

(56) References Cited

U.S. PATENT DOCUMENTS

| | | | | |
|---|---|---|---|---|
| 5,577,232 A * | 11/1996 | Priem et al. | ............ | 717/170 |
| 5,579,509 A * | 11/1996 | Furtney et al. | ............ | 717/170 |
| 6,279,030 B1 * | 8/2001 | Britton et al. | ............ | 717/173 |
| 6,415,435 B1 * | 7/2002 | McIntyre | ............ | 717/108 |
| 6,519,767 B1 * | 2/2003 | Carter et al. | ............ | 717/140 |
| 2005/0210466 A1 * | 9/2005 | Carter et al. | ............ | 717/178 |
| 2006/0200816 A1 * | 9/2006 | Pramanick et al. | ............ | 717/170 |
| 2007/0234352 A1 * | 10/2007 | Esders et al. | ............ | 717/175 |

OTHER PUBLICATIONS

Chakrabarti et al., "Interface Compatibility Checking for Software Modules"; CAV 2002 LNCS 2404, 2002.*
Pelhe et al., "Distributed Components in teh Project54 System"; UNH ECE Dept., 2004.*

* cited by examiner

*Primary Examiner*—Wei Y Zhen
*Assistant Examiner*—Ryan D Coyer
(74) *Attorney, Agent, or Firm*—Chapin IP Law, LLC (57) ABSTRACT

A software version rule-based pattern matching mechanism specifies version compatibility of a particular remote component by identifying a set of compatible versions operable with a particular server, and comparing the versions to determine compatibility of a purported revision component with an existing server (central component). The mechanism employs a rule based syntax for defining a set of compatible versions associated with a candidate component, and processes a version specifier, or range string mask, indicative of the set of compatible versions. The target version, such as the candidate component version, is then compared with each of the compatible versions indicated by the version string mask. If a matching compatible version is found, then the corresponding component (module) is deemed compatible.

18 Claims, 9 Drawing Sheets

| | | |
|---|---|---|
| 158-1 | * | THE SERVER WILL NOT COMPARE THAT PARTICULAR DIGIT OF THE REMOTE COMPONENT WITH ITS CORRESPONDING DIGIT |
| 158-2 | ! OR !N | THE SERVER WILL ACCEPT ALL DIGITS EXCLUDING |
| 158-3 | > OR >N | THE SERVER WILL ACCEPT ALL DIGITS GREATER THAN; USE CORRESPONDING SERVER VERSION DIGIT PLACE IF N NOT PROVIDED |
| 158-4 | >= OR >=N | THE SERVER WILL ACCEPT ALL DIGITS GREATER THAN OR EQUAL TO |
| 158-5 | < OR <N | THE SERVER WILL ACCEPT ALL DIGITS LESS THAN; USE CORRESPONDING SERVER VERSION DIGIT PLACE IF N NOT PROVIDED |
| 158-6 | <= OR <=N | THE SERVER WILL ACCEPT ALL DIGITS LESS THAN OR EQUAL TO; USE CORRESPONDING SERVER VERSION DIGIT PLACE IF N NOT PROVIDED |
| 158-7 | N OR =N OR = | THE SERVER WILL ACCEPT ALL DIGITS EQUAL TO; USE CORRESPONDING SERVER VERSION DIGIT PLACE IF N NOT PROVIDED |
| 158-8 | [X-Y] | THE SERVER WILL ACCEPT ALL DIGITS -IN THE RANGE X TO Y, BOTH INCLUSIVE |
| 158-9 | # [A, M, Z] | THE SERVER WILL ACCEPT ONLY DIGITS A, M OR Z |

SYSTEM AND METHODS FOR VERSION COMPATIBILITY CHECKING

BACKGROUND

A storage area network (SAN) typically interconnects many mass storage devices, commonly known as storage arrays, with a set of users for providing data storage and retrieval services to the user community. The storage area network interconnects a plurality of nodes including host computers, storage arrays, connectivity devices, and databases for providing the information retrieval services to the users. The host computers execute software entities known as agents for monitoring and managing the various nodes in the storage area network. In a large storage area network, the number of nodes may be substantial. Accordingly, users typically find it beneficial to operate a management application for monitoring and controlling the various nodes in the storage area network.

Conventional software systems typically operate in the context of a server operable to execute the management application. Often, the management application is a distributed application including many interoperating components. In a typical storage area network, the management application is in communication with a plurality of agents, each coupled to one or more manageable entities, such as storage array devices, hosts and agents in the storage area network.

Conventional management applications deploy agents on host computers (hosts) in the storage area network for effecting management and control operations. A variety of different types of agents are available for deployment, and each type generally monitors and manages a particular type of node, or manageable entity in the storage area network. The deployed agents monitor, control and manage various storage area network devices for providing command and control capability from a user console via a server coupled to the console. In an exemplary configuration, the SAN management application may be the EMC Control Center (ECC) application, marketed commercially by EMC Corporation of Hopkinton, Mass.

SUMMARY

In a conventional software development environment, successive versions of a software product are often released. The successive versions are improved versions of the predecessor, and may vary in scope from a few lines of source code to a major redesign. They may be characterized as major releases, minor releases, service packs, patches, bug fixes, custom modifications and others, depending on the magnitude and focus of the changes. Since conventional modern software systems are rather large and complex, complete redeployment of an entire system is usually not efficient. Accordingly, successive versions often replace or supplement modules, or components, of the software system, rather than superceding the entire deliverable software product.

Further, software applications are typically deployed at a number of customer sites. Not all sites necessarily receive the same set of successive revisions. Certain patches or bug fixes may be delivered only to a subset of the user sites. Further, some sites may simply not wish to deploy, or install, a particular routine service pack or revision. Accordingly, successive versions often follow a hierarchical, rather than a linear pattern. Therefore, when replacing components representing a particular version, compatibility with the existing system should be verified.

Applications with distributed components are commonplace in software organizations today. Applications and their components are versioned for maintainability purposes. Due to the nature of software development, new versions of components are churned on a continuous basis and components of different versions may not be "compatible" with each other. Organizations that deploy such applications perform upgrades as and when needed. Upgrades are typically performed when applications offer features that are needed by the organization. Note that upgrades may be performed on all components or on a subset of components (on a need-basis). This may create an environment in which components may be of different versions.

An exemplary application discussed herein employs multiple components that execute in a distributed manner. Such components are versioned. Component versions are syntactically designated by period-separated-multi-place strings, each place being a number. Some components can (a) communicate with each other and/or (b) work correctly with each other, if and only if they are deemed "compatible". Rigorous compatibility checking is hence an integral part of distributed applications to avoid undesirable application behavior, data corruption and possible downtime. In the exemplary management application discussed further below, component versions are used to perform compatibility checking at component start-up time (that is, components may not start-up if their versions are not compatible with each other). Configurations herein achieve component version checking using a robust and flexible pattern-matching approach that allows a clear, deterministic definition of versions of components that are interoperable. Accordingly, the implementation of the approach also obviates the need for source-code changes each time a new version of a component is rolled-out.

Conventional software versioning suffers from several deficiencies. Often, the various customer sites have different baseline configurations of installed software. It can be complex and/or difficult to assess the compatibility of a particular module (i.e. component) with the existing system. Therefore, it is important to assure that delivered version modules are compatible with the existing baseline to which they are applied. However, a typical configuration includes many modules, or components. For example, a network management application may include a central server component, or application, and a multitude of remote components, or modules, each having a particular version. Assessing the compatibility of each of the remote components to the central server component can be a formidable task. Therefore, scenarios can arise in which a conventional module is built against a central server that produces erroneous or undesirable operation. It would be beneficial, therefore, if the central server component examined the version of the remote components and compared it to a known set of compatible versions.

Configurations of the invention are based, in part, on the observation that it presents difficulties to manually examine each of the components associated with a particular version revision, or upgrade, particularly when such a revision is deliverable to many customer sites, each having a particular configuration to examine. Therefore, assurances of version compatibility may be difficult to provide with a conventional revision. Accordingly, configurations herein substantially overcome the above described shortcomings by providing a rule-based pattern matching mechanism that specifies version compatibility of a particular remote component by identifying a set of compatible versions operable with a particular server, and comparing the versions to determine compatibility of a purported revision component with an existing server (central component).

The mechanism employs a rule based syntax for defining a set of compatible versions associated with a candidate component, and processes a version specifier, or range string mask, indicative of the set of compatible versions. The target version, such as the candidate component version, is then compared with each of the compatible versions indicated by the version string mask. If a matching compatible version is found, then the corresponding component (module) is deemed compatible.

Each of the remote components has a version, indicated by a version string. The management application at the central server (server) maintains a repository of version expressions for each of the remote components. The version expressions employ the syntax disclosed herein, and are defined as a set of version string masks operable to denote the set of compatible versions. The version string masks have a set of expressions to define allowable values for each digit place of the compatible versions. A digit place corresponds to a period delimited digit in the candidate version. The candidate version is specified as a version string, including digit places delimited by periods. The version string mask is specified as a set of digit groups, each corresponding to a digit place, and identifies compatible values by the expression. Each of the expressions defines allowable values for the digit place, according to the rule based syntax, such as ranges, wildcards and enumerated values, discussed further below.

In further detail, the method of checking software version compatibility includes receiving a version string indicative of a software version, and receiving a version string mask indicative of compatible versions. The version string mask includes digit groups corresponding to digits in the received version string. A checker process compares the version string to the version string mask using a rule-based pattern matching approach for each of the digit groups, and determines compatibility of the software version based on the comparing. Each of the digit groups includes a digit expression, in which the digit expression is operable for evaluation with a corresponding digit place in the received version string. The checker evaluates each of the digit expressions in the received version string mask to a corresponding place in the received version string. The evaluation includes parsing the syntax of the digit expression, and referencing a rule list indicative of the syntax.

In the exemplary arrangement, the version string mask is included in a range mask having a set of version string masks. The range mask further includes a minimum and a maximum, such that the minimum and the maximum defines a range of allowable version string masks. The checker evaluates the range mask by comparing (computing) if each of the version string masks indicates compatibility with the lower range of the range mask, and by comparing if each of the version string masks indicates compatibility with the upper range of the range mask. For each version string mask in range mask, the checker compares the version string mask to the version string. The checker computes if the version string mask indicates compatibility with the version string, and evaluates the version string as compatible if the version string mask indicates compatibility.

In the exemplary configuration, the checker compares the version string mask to the version string by iterating, for each digit group in the version string mask, and evaluating the expression in the digit group of the version string mask. The checker matching the evaluated expression to the corresponding digit place in the version string, and concludes, if each of the digit places satisfies the corresponding evaluated expression, that the version string mask is indicative of a valid version string. The exemplary management application discussed herein employs a version string having five digit places and a version string mask including a five digit groups, however alternate configurations may employ other numbers of version digit places.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations discussed herein provide a rule-based pattern matching mechanism that specifies version compatibility of a particular remote component by identifying a set of compatible versions operable with a particular server version, and comparing the versions to determine compatibility of a purported revision component with an existing central server, application, or component. The mechanism employs a rule based syntax for defining a set of compatible versions associated with a candidate component, and processes a version specifier, or range string mask, indicative of the set of compatible versions. Component version checking as defined herein typically occurs upon component startup, however, may occur during installation or at a later time during execution, as appropriate or as needed. The target version, such as the candidate component version, is then compared with the set of compatible versions indicated by the version string mask. If a matching compatible version is found, then the corresponding component (module) is deemed compatible.

Each of the remote components has a version, indicated by a version string. The management application at the central server (server) maintains a repository of version expressions for each of the remote components. The version expressions employ the syntax disclosed herein, and are defined as a set of version string masks operable to denote the set of compatible versions. The version string masks have a set of digit expressions (expressions) to define allowable values for each digit place of the compatible versions. A digit place corresponds to a period delimited digit in the candidate version. The candidate version is specified as a version string, including digit places delimited by periods. The version string mask is therefore specified as a set of digit groups, each corresponding to a digit place, and identifies compatible values by the expression. Each of the expressions defines allowable values for the digit place, according to the rule based syntax, such as ranges, wildcards and enumerated values, discussed further below.

Figure 1:
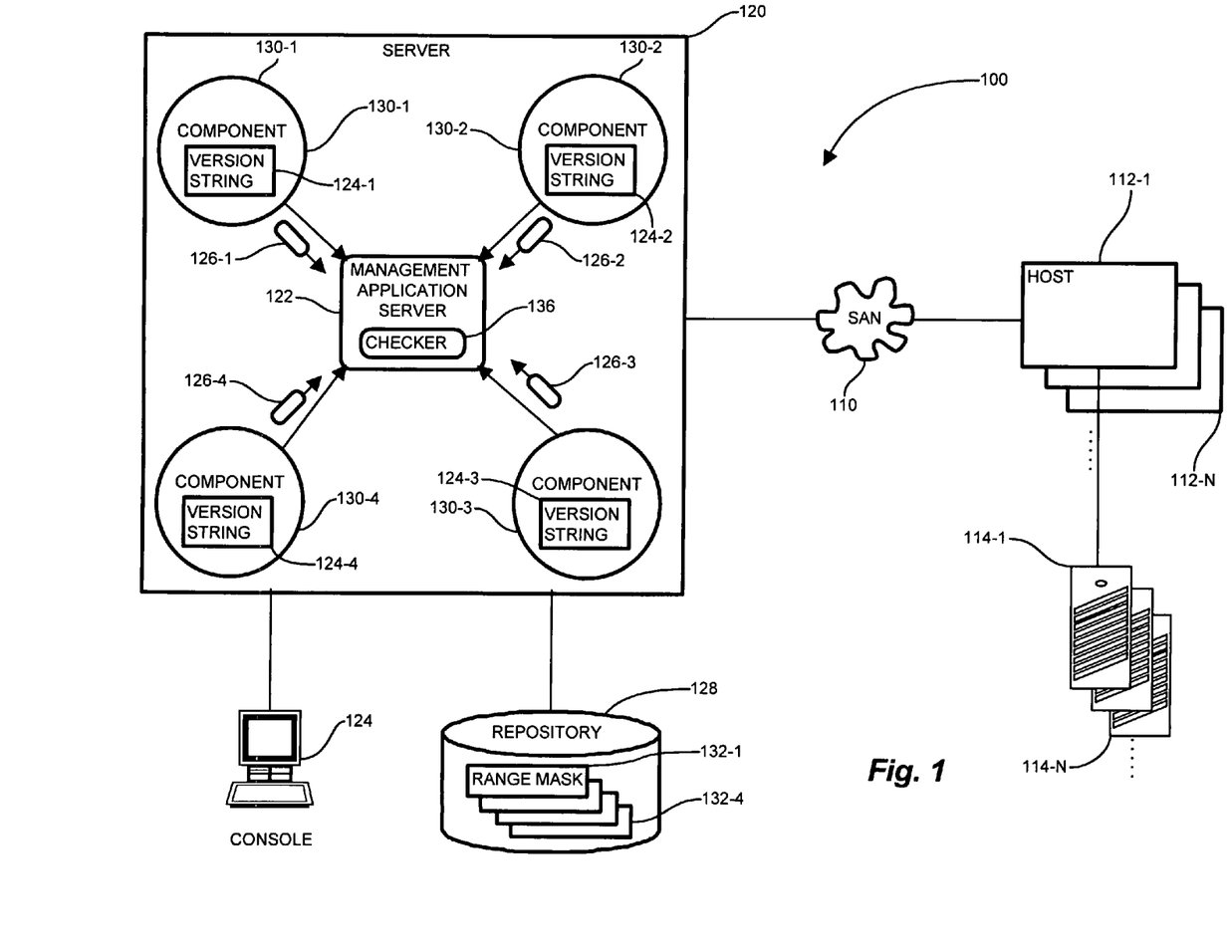
FIG. 1 is a context diagram of an exemplary managed information environment suitable for use with the present invention.

FIG. 1 is a context diagram of an exemplary managed information environment suitable for use with the present invention. Referring to FIG. 1, the environment 100 includes a storage area network 110 operable for interconnecting a plurality of hosts 112-1 . . . 112-N (112 generally) and manageable entities 114-1 . . . 114-N (114, generally). In the exemplary configuration, the manageable entities include storage arrays, such as a Symmetrix Device, marketed commercially by EMC Corporation of Hopkinton, Mass., as well as other storage arrays, hosts, connectivity devices such as switches, and agents. The storage area network 110 connects each of the manageable entities 112, 114 to a server 120 having a management application server 122 (management application). The manageable entities 112, 114 are responsive to the management application 122 for monitoring and maintaining the manageable entities. The management application server 122 is in communication with a repository 128, for storing the range masks, discussed further below. The repository 128 is a storage medium of the console, such as a local disk drive, or any suitable memory/disk structure. The management application 122 is also coupled to one or more software components 130-1 . . . 130-4 (130 generally) containing business logic, such as processing instructions and data involved with monitoring and maintaining the manageable entities 112, 114. The management application server 122 is further responsive to a console 125, which provides a Graphical User Interface (GUI) for receiving user commands and displaying output, and is itself a remote component 124 applicable to version checking as defined herein.

As indicated above, the components 130 are distributed components each deployed independently of the other components 130. Both the management application 122 and the components 130 are versioned (i.e. assigned a version) for maintainability purposes to be employed as discussed herein. The management application 122 stores a range mask 132-1 . . . 132-4 (132 generally) in a repository 128 for each of the remote components 130. The range mask 132 is indicative of the versions of the component 130 that the management application server 122 is compatible with. Each of the components 130 has a corresponding a version string 124 indicating the current version of the component 130. Accordingly, upon startup of the component 130 or at another appropriate time, the component 130 sends a version message 126-1 . . . 126-4 (126, generally) having the version string 124. A compatibility checker 136 (checker) in the management application server 122 receives the version message 126 and processes the version string 124 and the range mask 132 of the component 130 to determine compatibility, as now discussed in further detail.

Figure 2:
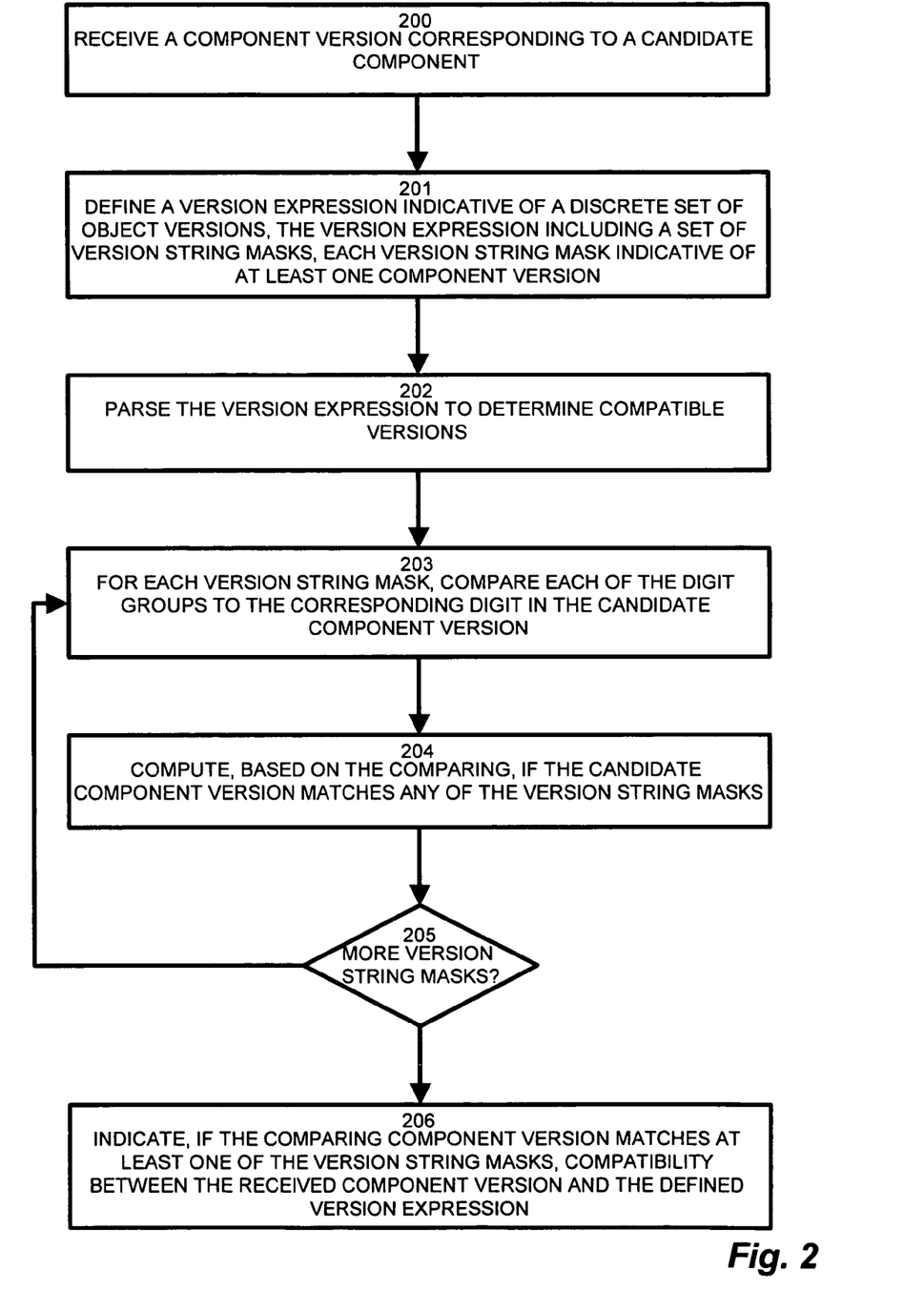
FIG. 2 is a flowchart of component version compatibility checking in the environment of FIG. 1.

FIG. 2 is a flowchart of component version compatibility checking in the environment of FIG. 1. Referring to FIGS. 1 and 2, the method of checking software compatibility using a pattern matching rule based subsystem for intercomponent version checking as disclosed herein includes receiving a component version corresponding to a candidate component 130, as depicted at step 200. The component version is a version string 124 sent in a version message 126 by the starting component 130. At step 201, the management application server 122 fetches a version expression indicative of a discrete set of object versions and stored in a repository 128 as a range mask 132, discussed further below. The version expression includes a set of version string masks, in which each version string mask (150, also discussed further below) is indicative of at least one component version.

A checker 136 in the management application 122 parses the version expression to determine compatible versions, as shown at step 202. The checker 136 therefore computes compatibility for a particular component 130 by examining the version string 124 in the version message 126 to determine if that version is in the set of compatible versions specified in the set of version string masks 150 for the particular candidate component 130. Accordingly, parsing the version expression further includes, for each version string mask 150, comparing each of the digit groups (discussed below) to the corresponding digit in the candidate component version, as depicted at step 203. At step 204, The checker 136 computes, based on the comparing, if the candidate component 130 version expressed in the version string 124 matches any of the version string masks stored in the range mask 132 for that component 130.

A check is performed, at step 205, if the version string 124 does not match, to determine if there are more version string masks 150 to examine for the component 130, and control reverts to step 203 accordingly. At step 206, the checker 136 indicates, if the compared component version 124 matches at least one of the version string masks 150, compatibility between the received component version 124 and the defined version expression (i.e. version string masks 150).

Figure 3:
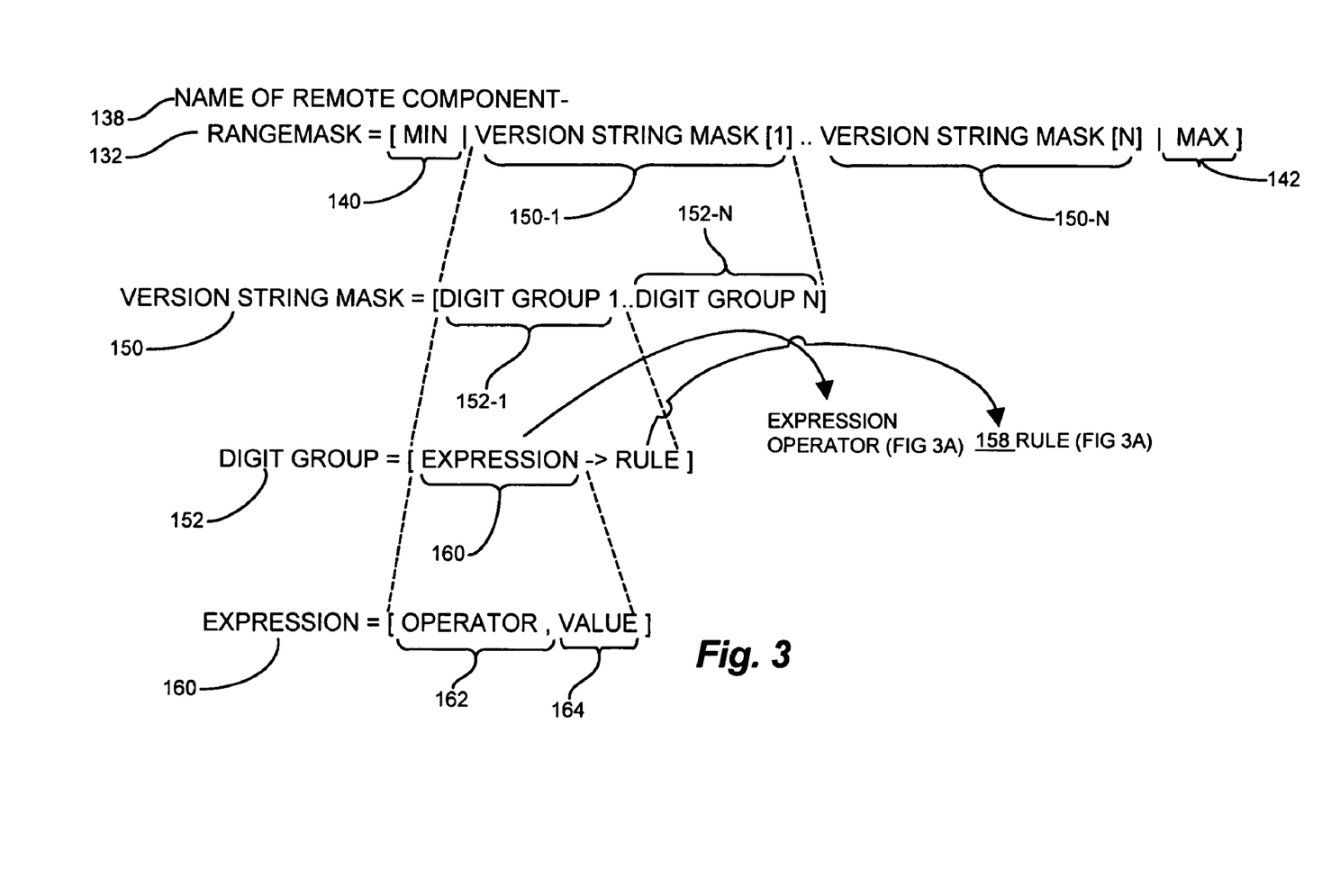
FIG. 3 is a syntax diagram of version specification for specifying compatible versions.
Figure 3A:
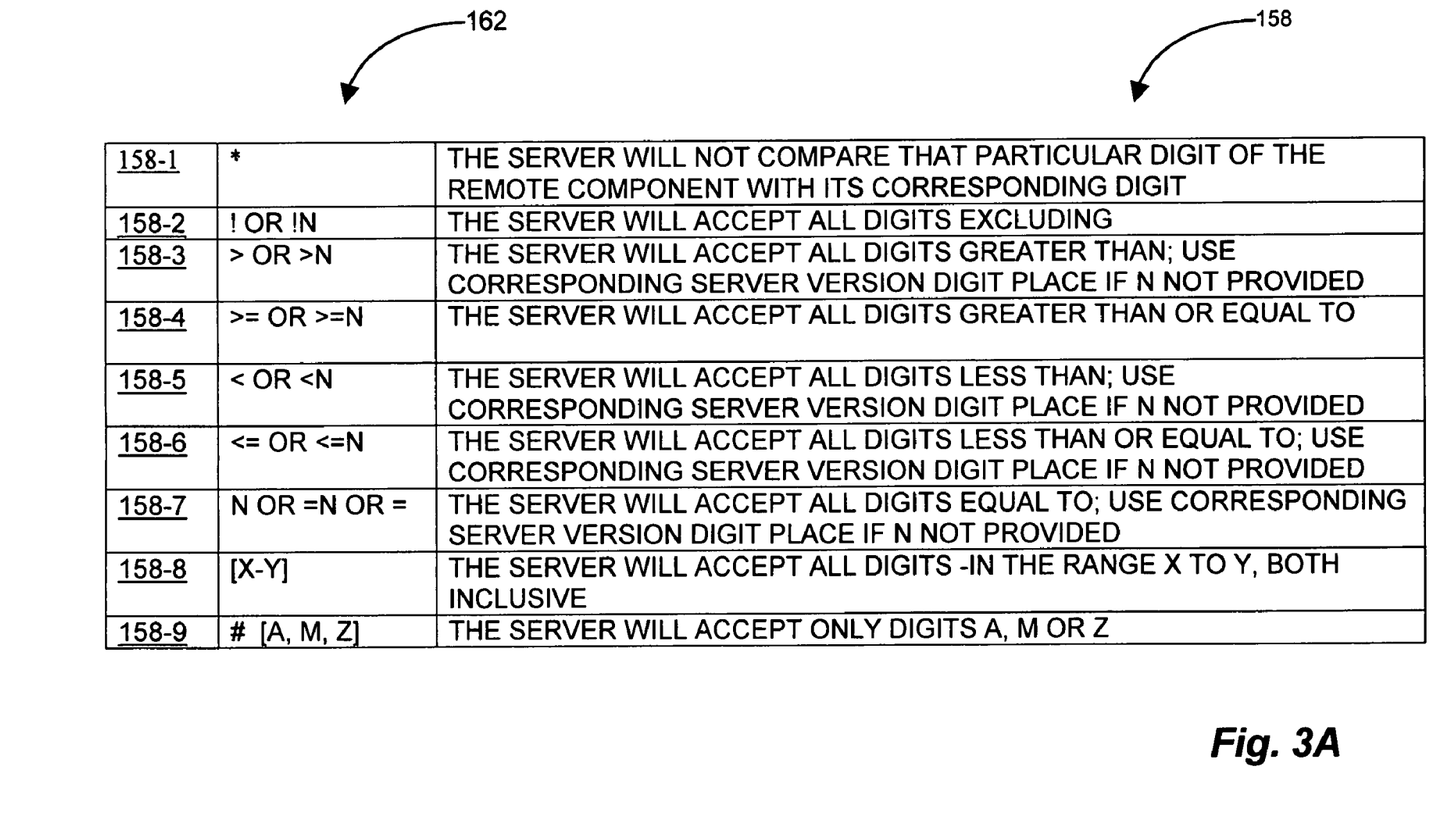
FIG. 3A is a rule list employed by the syntax of FIG. 3.

FIG. 3 is a syntax diagram of version specification for specifying compatible versions, and FIG. 3A is a list of the operator 162 and corresponding rules 158. Referring to FIGS. 1, 3 and 3A, the server 120 stores a range mask 132 for each remote component 130 which it expects to startup. The repository 128 stores the range masks 132 indexed by the unique name 138, or other indexing scheme, of the remote component 130. Each range mask 132 includes a minimum 140 and a maximum 142, which indicate the minimum and maximum compatible versions for the component 130. A set of one or more version string masks 150-1 . . . 150-N (150 generally) further indicates which versions within the minimum and maximum are compatible. During server 120 startup (i.e. management application startup) the server 120 validates each range mask 132 to ensure consistency of the minimum and maximum versions and that the version string masks 150 are indicative of values within the range specified by the minimum 140 and maximum 142. Alternatively, a single version value may be specified, and is taken as the only version deemed compatible (hence, it covers the minimum, maximum and set of version string masks 150).

Each version string mask 150 includes a digit group 152-1 . . . 152-N, for each of the digits in the version string, as indicated by N. For the remote components 130, each version is specified by an ordered set of N digits delimited by a ".", as is known in the art. Each less significant digit represents a minor revision, or sub-version, of the digit place before it. Therefore, the version string 124 of the component 130 has as many digits as the digit groups 152 in the version string mask 150 to which it is being compared, and thus lends itself well to comparison of digits to a corresponding digit group.

Each digit group 152 indicates an allowable value in the corresponding digit place of the version string 124. The digit groups 152 include an expression 160, which corresponds to a rule 158-1 . . . 158-9 (158 generally). The rule 158 specifies how to evaluate the expression 160. The expression 160 includes an operator 162, which is a parseable symbol denoting the rule 158, and corresponding values 164, depending on the operator 162. Briefly, for a version to be deemed compatible, each digit in the version string 124 must satisfy the corresponding digit group 152 in the version string mask 150. For the range operators (i.e. <, >, <= and =>, denoted by rules 158-3 . . . 158-6), if the value 164 is omitted, then the checker 136 uses the corresponding digit place of the management application server 122 as the value 164. This feature allows the compatible versions of the remote components 130 to be compatible with a similar server (management application) 122 version without updating a hardcoded value 164 in the range mask 124 each time a version upgrade occurs. If a version string 124 satisfies any of the version string masks 150 in the range mask 132, the component 130 is deemed compatible.

For example, say a remote component version should have a MIN (140) of 5.2.0.0.0 (for version 5.2.0 GA), a MAX (142) of 5.2.0.2.0 (5.2.0 Service Pack 2), but can also be 5.2.0.1.0 (for version 5.2.0 Service Pack 1). The following syntax defines three viable range masks 132 for satisfying this criteria:

[Remote Component Name] Range
mask=5.2.0.0.0|5.2.0.<=2.0|5.2.0.2.0 OR

[Remote Component Name] Range
mask=5.2.0.0.0|5.2.0.<3.0|5.2.0.2.0 OR

[Remote Component Name] Range
mask=5.2.0.0.0|5.2.0.*.0|5.2.0.2.0.

Figure 4:
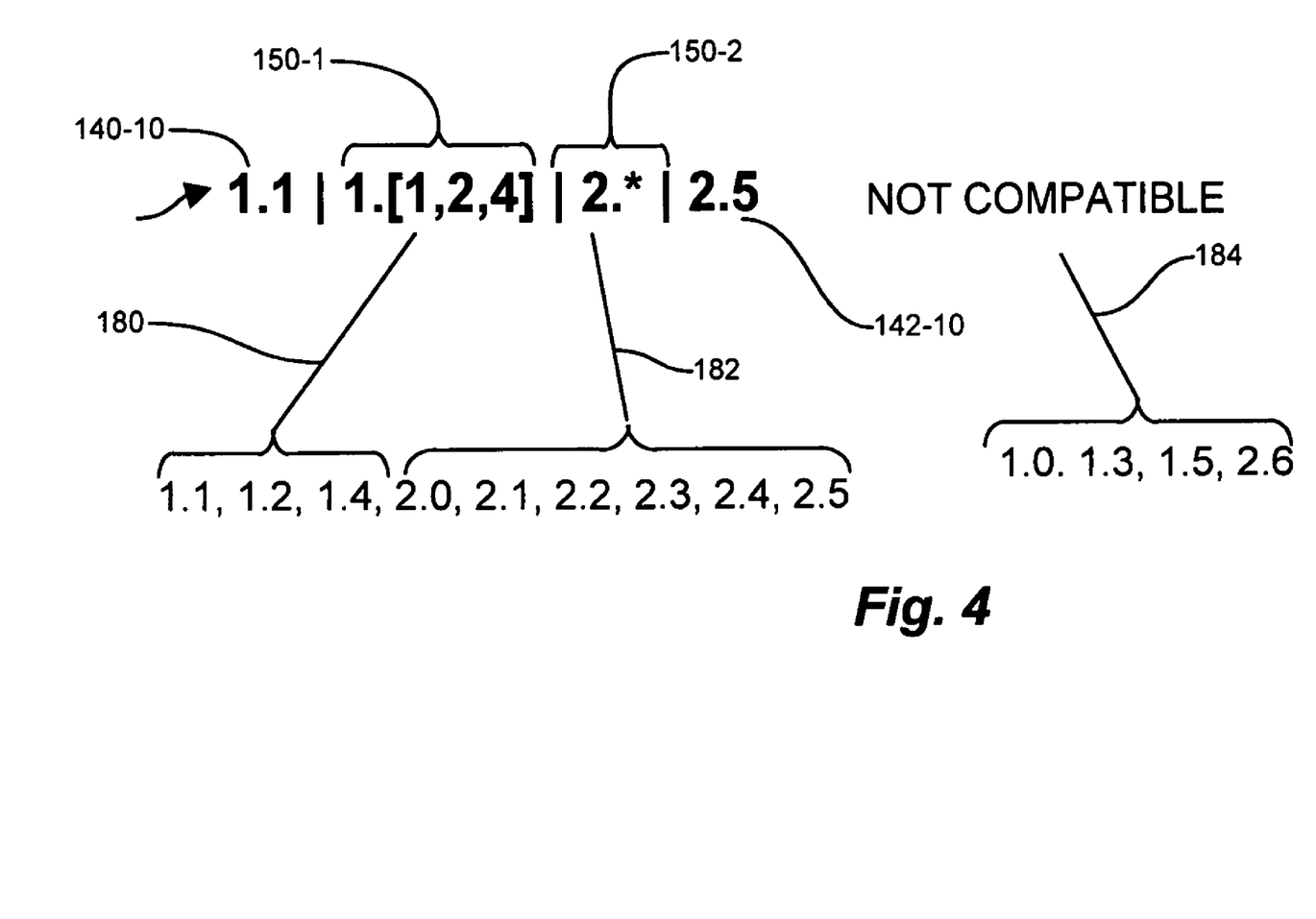
FIG. 4 is an example of version checking using the syntax of FIG. 3.

FIG. 4 is a further example of range mask specification for version checking using the syntax of FIG. 3. Referring to FIGS. 3 and 4, an exemplary range mask 132-10 defines a minimum version 140-10 of 1.1 and a maximum version 142-10 of 2.5. A first version string mask 152-1 allows a first digit (major version) of 1 and a second digit (minor revision) of 2 or 4, but not 3. Alternatively, the expression 2-4 would be operable to include versions 2, 3, and 4. Accordingly, the set 180 of versions satisfying this version string are shown. A second version string mask 152-2 allows a first digit (major version) of 2 (i.e. release 2 of the component 130), and a second digit (minor revision) having a wildcard*operator, indicating that any value is acceptable. However, compatible versions are still limited by the maximum 142 version, which limits the versions to 2.5, despite any wildcard operators in the version string masks. Hence, the set of compatible versions 182 permitted by the second version string mask 152-2 are shown. An exemplary set 184 of incompatible versions is also shown.

FIGS. 5-8 are a flowchart of version comparison using the syntax of FIG. 3. Referring to FIGS. 1, 3 and 5-8, the method of checking software compatibility using a pattern matching rule based subsystem for intercomponent version checking is disclosed in further detail. The management application 122 executing on the server 120 receives a component version string 124 indicative of a software version and corresponding to a candidate component 130, as depicted at step 300. In the exemplary configuration, the candidate components 130 are software component objects operable for deployment and/or execution in conjunction with the server 120, in which the components 130 are responsive to the server 120, as depicted at step 301. Such a configuration may include a storage area network 110, in which the components 130 are distributed components of a storage area network (SAN) management application 122, responsible for managing the manageable entities 112 and 114 via the SAN 110 interconnection. However, alternate configurations are also operable to employ the version checking mechanism discussed further below.

Figure 5:
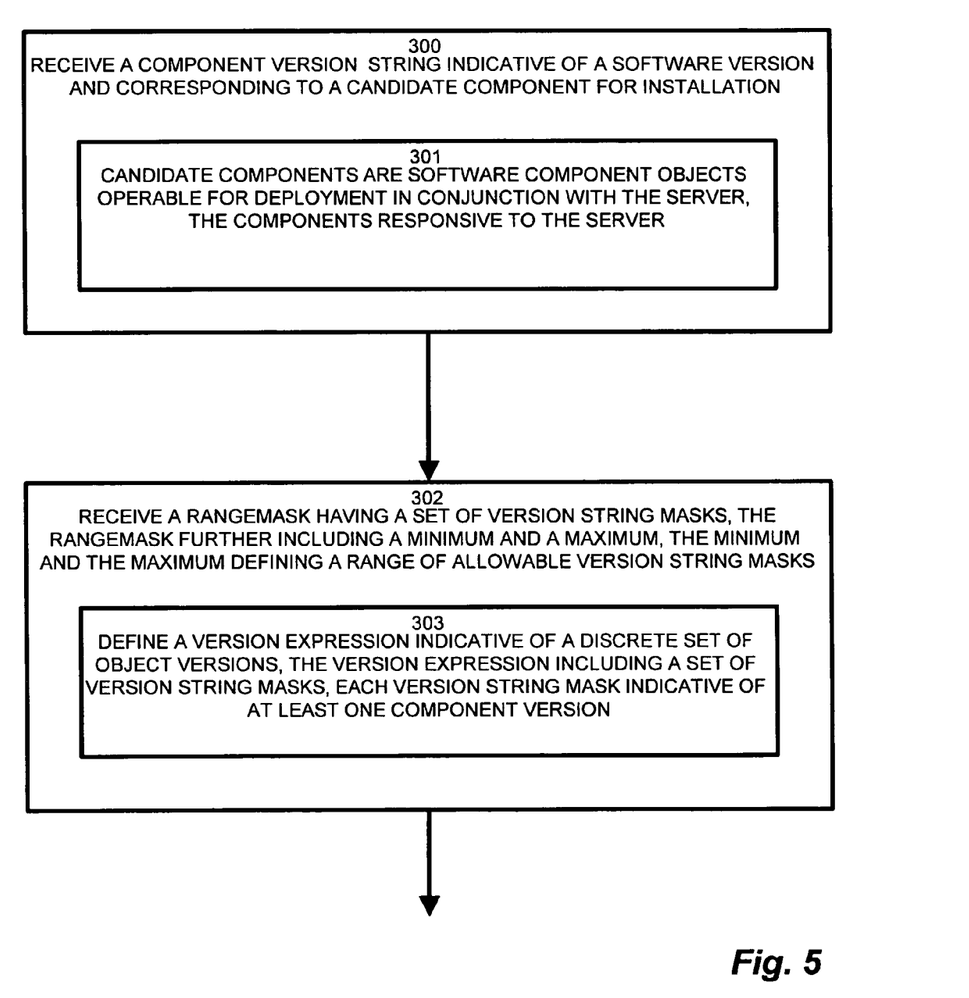
FIGS. 5-8 are a flowchart of version comparison using the syntax of FIG. 3.

Each of the components 130 sends the version string message 124 upon startup, including the name of the remote component 138, and the checker 136 identifies the corresponding range mask 132 in the repository 128 for that component 130 according to the component name 138. Using the repository 128, the checker receives a range mask 132 having a set of version string masks 150, as depicted at step 302. The range mask 132 further includes a minimum 140 and a maximum 142, such that the minimum 140 and the maximum 142 define a range of allowable version string masks 150. As depicted at step 303, the range mask 132, therefore, defines a version expression indicative of a discrete set of object versions (i.e. component 130 versions), in which the version expression includes a set of version string masks 150, such that each version string mask 150 is indicative of at least one component 130 version. The range mask 132 is typically defined by an operator prior to component 130 startup. The operator defining the range mask 132 identifies compatible versions from various development criteria, such as engineering specifications and design documents, and defines the range mask 132 to cover, or identify, the set of component 130 versions that are compatible with the management application server 122. As the management application server 122 is itself a dynamic entity subject to the build constraints outlined above, the range masks 132 may be examined and updated upon changes to either the management application 122 or the remote components 130.

Figure 6:
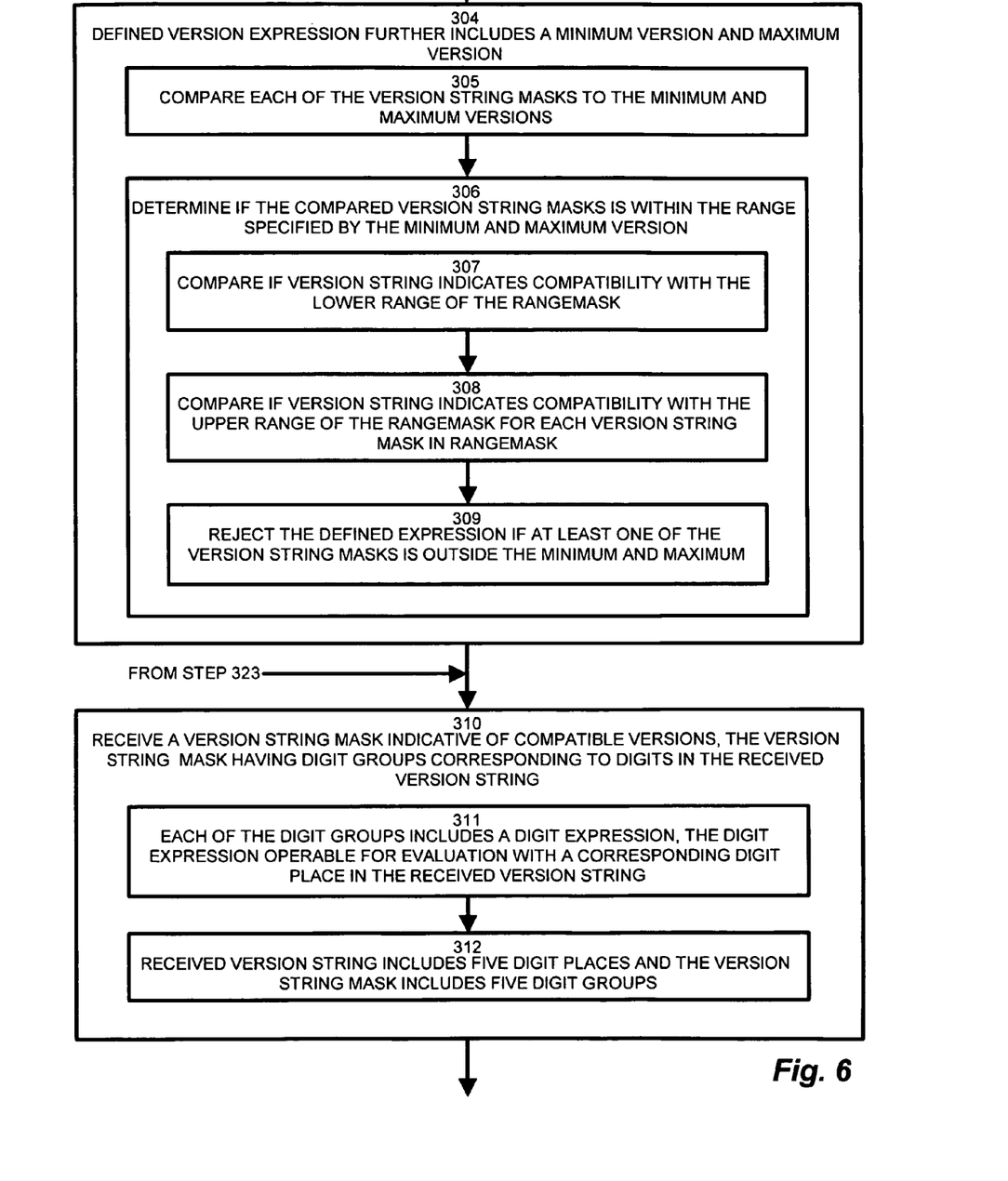

Upon receiving the range mask, at step 304, the checker 136 validates the range mask 132. The defined range mask 132, or version expression, further includes a minimum version 140 and maximum version 142. Accordingly, the checker 136 compares each of the version string masks 150 to the minimum 140 and maximum versions 142, as disclosed at step 305. Accordingly, at step 306, the checker 135 determines if the compared version string masks 150 are within the range specified by the minimum 140 and maximum 142 version. At step 307, the checker 136 compares if the version string mask 150 indicates compatibility with the lower range 140 of the range mask. At step 308, the checker compares if the version string mask 150 indicates compatibility with the upper range 142 of the range mask 132 for each version string mask 150 in range mask. At step 309, the checker 136 rejects the range mask 132 (e.g. defined version expression) if any of the version string masks 150 is outside the minimum 140 and maximum 142. If the range mask is rejected, then the management application server 122 will not accept any communication from the component 130 corresponding to the invalid range mask. The validation is therefore the first of a two part test: first, for the integrity check of range mask (expression), and second, the version check of software component 130, below.

If the range mask 132 is valid, then at step 310, the checker 136 identifies, from the received range mask 132, the first (and later, successive) version string mask 150 included in the version string masks 150-N in the range mask. The version string mask 150 is indicative of the compatible versions of the candidate component 130 from which it was received. The version string mask 150 has one or more digit groups 152 corresponding to digits in the received version string 124 from the candidate component 130. Therefore, each of the digits (values) in the version string 124 corresponds to a digit group in the version string mask 150.

Each of the digit groups 152 includes a digit expression 160, in which the digit expression 160 is operable for evaluation with a corresponding digit place in the received version string 124, as depicted at step 311. In the exemplary arrangement, the received version string 124 includes five digit places and the version string mask 150 includes five digit groups, depicted at step 312, however other numbers of digit places may be employed in alternate configurations.

Figure 7:
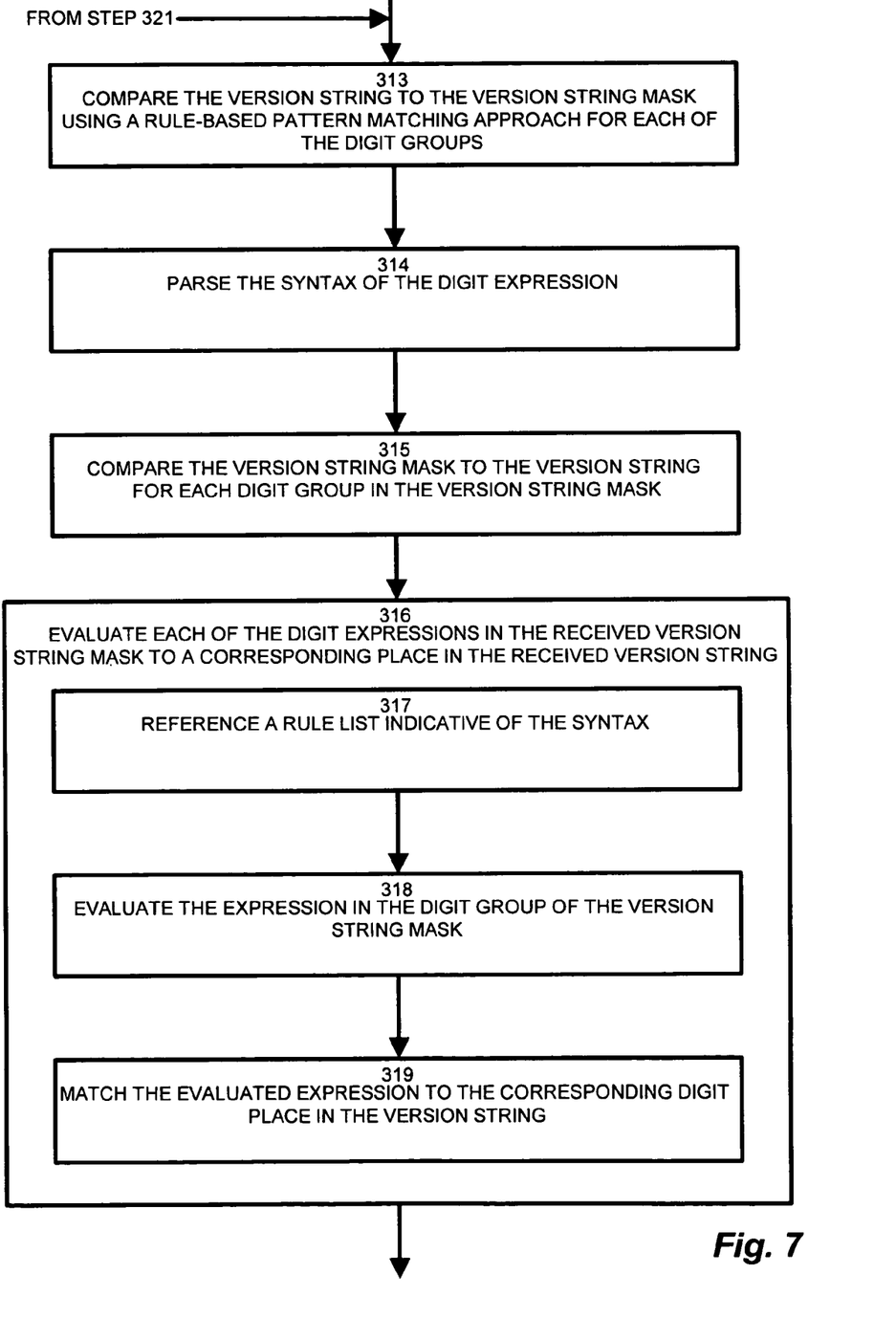

At step 313, the checker 136 compares the version string 124 to each of the version string masks 150 using a rule-based pattern matching approach for each of the digit groups 152, as shown by the rules 162. The checker 136 parses the syntax of the each successive digit expression 160 from the digit group 152 in the version string mask 150. The checker 136 parses the expression 160, and parses the expected operators 162 and values 164 as determined by the rule 158 corresponding to the operator 162, as depicted at step 314. The checker 136 compares the version string mask 150 to the version string 124 for each digit group 152 in the version string mask 150, as depicted at step 315.

At step 316, based on the comparing, the checker evaluates each of the digit expressions 160 in the received version string mask 150 to a corresponding place in the received version string 124. At step 317 the checker 136 references the rule list 158 indicative of the operator 162 and value 164 syntax. The checker 136 evaluates the parsed expression 160 in the digit group 152 of the version string mask 150, as depicted at step 318. The checker 136 matches the evaluated expression 160 to the corresponding digit place in the version string 124 to determine if the digit place satisfies the digit group 152, as shown at step 319.

Figure 8:
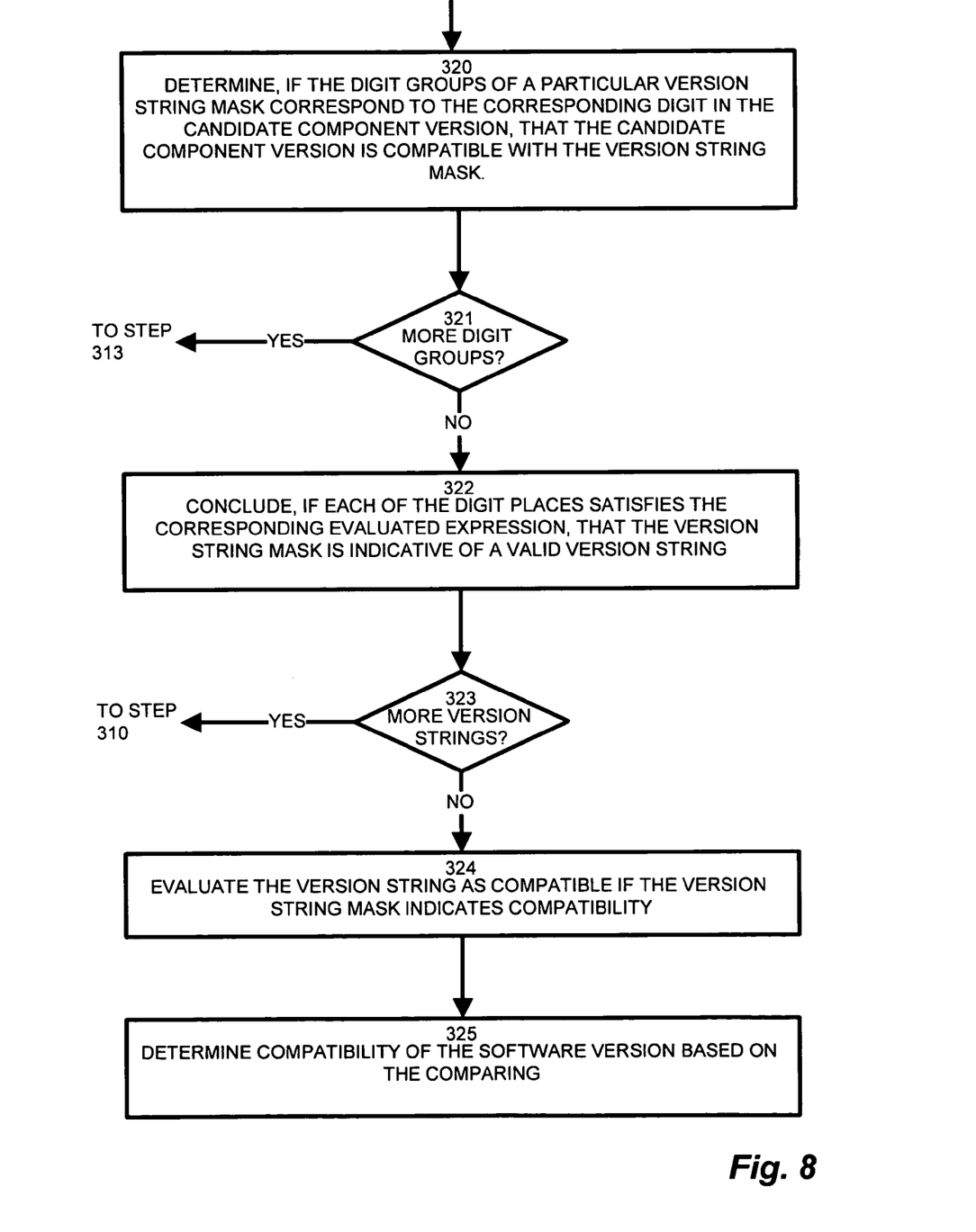

At step 320, the checker 136 determines, if the digit groups 152 of a particular version string mask 150 correspond to the corresponding digit in the candidate component version string 124 (i.e. the digit satisfies the digit group), that the candidate component 130 version is compatible with the version string mask 150. The checker 136 iterates through each of the digit and digit groups for a particular version string 124-version string mask 150 pair. A check is performed, at step 321, to determine if there are more digit groups for the particular version string-version string mask pair. If so, then control reverts to step 313 to examine the remaining digit groups. At the first digit for which an incompatible digit place is found, the version string mask is deemed not satisfying the compatibility check.

At step 322, the checker 126 concludes, if each of the digit places in the version string mask satisfies the corresponding evaluated expression, that the version string 124 mask 150 is indicative of a compatible version string 124. Otherwise, a check is performed to determine if there are more version strings masks 150 in range mask 132, as depicted at step 323, and control reverts to step 310 accordingly to compare the remaining version string masks 150 in the range mask 132.

The checker 136 then evaluates the version string 124 as compatible if the version string mask 150 indicates compatibility, as depicted at step 324. The checker 136 therefore determines compatibility of the software version based on the comparison for the particular candidate component 130, as depicted at step 325.

Those skilled in the art should readily appreciate that the programs and methods for performing software version compatibility checking as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for performing version compatibility checking has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A computer-implemented method of checking software version compatibility comprising:

receiving a version string indicative of a software version;

receiving a version string mask indicative of compatible versions, the version string mask having digit groups corresponding to digits in the received version string, each of the digit groups including a digit expression, the digit expression operable for evaluation with a corresponding digit place in the received version string, the version string mask further comprising a range mask having a set of version string masks, the range mask further including a minimum and a maximum, the minimum and the maximum defining a range of allowable version string masks;

comparing the version string to the version string mask using a rule-based pattern matching approach for each of the digit groups, comparing further including:

comparing if the version string mask indicates compatibility with the lower range of the range mask;

comparing if the version string mask indicates compatibility with the upper range of the range mask; and for each version string mask in the range mask:

comparing the version string mask to the version string;

computing if the version string mask indicates compatibility with the version string; and evaluating the version string as compatible if the version string mask indicates compatibility; and determining compatibility of the software version based on the comparing.

2. The method of claim 1 further comprising evaluating each of the digit expressions in the received version string mask to a corresponding place in the received version string, evaluating including:
   parsing the syntax of the digit expression; and
   referencing a rule list indicative of the syntax.

3. The method of claim 1 wherein comparing the version string mask to the version string further comprises
   for each digit group in the version string mask
      evaluating the expression in the digit group of the version string mask
      matching the evaluated expression to the corresponding digit place in the version string; and
      concluding, if each of the digit places satisfies the corresponding evaluated expression, that the version string is indicative of a compatible version.

4. The method of claim 3 wherein the received version string includes five digit places and the version string mask included five digit groups.

5. A computer-implemented method of checking software compatibility using a pattern matching rule based subsystem for intercomponent version checking comprising:
   receiving a component version corresponding to a candidate component;
   defining a version expression indicative of a discrete set of object versions, the version expression including a set of version string masks having digit groups, each version string mask indicative of at least one component version;
   parsing the version expression to determine compatible versions, parsing further including:
      for each version string mask, comparing each of the digit groups to the corresponding digit in the candidate component version, each of the digit groups including a digit expression, the digit expression operable for evaluation with a corresponding digit place in the received candidate component version;
      the version string mask further comprising a range mask having a set of version string masks, the range mask further including a minimum and a maximum, the minimum and the maximum defining a range of allowable version string masks, comparing further including:
         comparing if the version string mask indicates compatibility with the lower range of the range mask;
         comparing if the version string mask indicates compatibility with the upper range of the range mask; and
         for each version string mask in the range mask;
            comparing the version string mask to the candidate component version;
            computing if the version string mask indicates compatibility with the candidate component version; and
            evaluating the version string as compatible if the version string mask indicates compatibility;
         computing, based on the comparing, if the candidate component version matches any of the version string masks; and
         indicating, if the candidate component version matches at least one of the version string masks, compatibility between the received component version and the defined version expression.

6. The method of claim 5 wherein computing further comprises determining, if the digit groups of a particular version string mask correspond to the corresponding digit in the candidate component version, that the candidate component version is compatible with the version string mask.

7. The method of claim 6 wherein the defined version expression further includes a minimum version and maximum version, further comprising:
   comparing each of the version string masks to the minimum and maximum versions;
   determining if the compared version string masks is within the range specified by the minimum and maximum version; and
   rejecting the defined expression if at least one of the version string masks is outside the minimum and maximum.

8. The method of claim 6 wherein the computing further comprises identifying compatible versions, the compatible versions defined by a syntactically based expression indicative of a discrete set of objects, further comprising:
   receiving a version string indication of an actual versions;
   comparing the received version string to the acceptable version to determine compatibility.

9. The method of claim 8 wherein the version expression is a range mask having a set of version string masks.

10. The method of claim 9 wherein the candidate components are software component objects operable for deployment in conjunction with server, the components responsive to the server.

11. The method of claim 10 further comprising, for each of the version string masks in the range mask:
   comparing the version string mask to the minimum and maximum; and
   rejecting the range mask if any of the version string masks is outside the range defined by the minimum and maximum.

12. An application server for checking software version compatibility comprising:
   a memory;
   an interface to at least one remote component for receiving a version string indicative of a software version;
   an interconnection to a repository having a version string mask indicative of compatible versions, the version string mask having digit groups corresponding to digits in the received version string, each of the digit groups including a digit expression, the digit expression operable for evaluation with a corresponding digit place in the received version string,
   the version string mask further comprising a range mask having a set of version string masks, the range mask further including a minimum and a maximum, the minimum and the maximum defining a range of allowable version string masks; and
   a checker operable to compare the version string to the version string mask using a rule-based pattern matching approach for each of the digit groups, and further operable to determine compatibility of the software version based on the comparing, the comparing further including:
      comparing if the version string mask indicates compatibility with the lower range of the range mask;
      comparing if the version string mask indicates compatibility with the upper range of the range mask; and
      for each version string mask in the range mask;
         comparing the version string mask to version string;
         computing if the version string mask indicates compatibility with the version string; and
         evaluating the version string as compatible if the version string mask indicates compatibility.

13. The server of claim 12 wherein the checker is further operable to evaluate each of the digit expressions in the received version string mask to a corresponding place in the received version string, evaluating including:
parsing the syntax of the digit expression; and
referencing a rule list indicative of the syntax.

14. The server of claim 12 wherein the checker is further operable to compare the version string mask to the version string by:
for each digit group in the version string mask:
evaluating the expression in the digit group of the version string mask
matching the evaluated expression to the corresponding digit place in the version string; and
concluding, if each of the digit places satisfies the corresponding evaluated expression, that the version string is indicative of a compatible component version.

15. A computer program product having a computer readable storage medium operable to store computer program logic embodied in computer program code encoded thereon for versioning software and performing compatibility checking comprising:
computer program code for receiving a component version corresponding to a candidate component;
computer program code for defining a version expression indicative of a discrete set of object versions, the version expression including a set of version string masks having digit groups, each version string mask indicative of at least one component version;
computer program code for parsing the version expression to determine compatible versions, parsing further including:
for each version string mask, computer program code for comparing each of the digit groups to the corresponding digit in the candidate component version, each of the digit groups includes a digit expression, the digit expression operable for evaluation with a corresponding digit place in the candidate component version,
the version string mask further comprising a range mask having a set of version string masks, the range mask further including a minimum and a maximum, the minimum and the maximum defining a range of allowable version string masks, comparing further including:
comparing if the version string mask indicates compatibility with the lower range of the range mask;
comparing if the version string mask indicates compatibility with the upper range of the range mask; and
for each version string mask in the range mask;
comparing the version string mask to the candidate component version;
computing if the version string mask indicates compatibility with the candidate component version; and
evaluating the version string as compatible if the version string mask indicates compatibility;
computer program code for evaluating each of the digit expressions in the received version string mask to a corresponding place in the received version string, evaluating including:

parsing the syntax of the digit expression; and
referencing a rule list indicative of the syntax;
computer program code for computing, based on the comparing, if the candidate component version matches any of the version string masks; and
computer program code for indicating, if the comparing component version matches at least one of the version string masks, compatibility between the received component version and the defined version expression.

16. A SAN management server for versioning software and performing compatibility checking comprising:
means for receiving a version string indicative of a software version;
means for receiving a version string mask indicative of compatible versions, the version string mask having digit groups corresponding to digits in the received version string, each of the digit groups including a digit expression, the digit expression operable for evaluation with a corresponding digit place in the received version string,
the version string mask further comprising a range mask having a set of version string masks, the range mask further including a minimum and a maximum, the minimum and the maximum defining a range of allowable version string masks;
means for comparing the version string to the version string mask using a rule-based pattern matching approach for each of the digit groups, comparing further including:
comparing if the version string mask indicates compatibility with the lower range of the range mask;
comparing if the version string mask indicates compatibility with the upper range of the range mask; and
for each version string mask in the range mask:
comparing the version string mask to the candidate component version;
computing if the version string mask indicates compatibility with the candidate component version; and
evaluating the version string as compatible if the version string mask indicates compatibility; and
means for determining compatibility of the software version based on the comparing, comparing further including determining, if the digit groups of a particular version string mask correspond to the corresponding digit in the candidate component version string, that the candidate component version is compatible with the version string mask.

17. The method of claim 1 wherein the version string includes period delimited digit places, each digit place compared to a corresponding set of digit groups in the version string mask.

18. The method of claim 1 wherein each digit place in the version string corresponding to a plurality of matching fields in the version string mask, the plurality of matching fields defined by a set of digit groups.

* * * * *

UNITED STATES PATENT AND TRADEMARK OFFICE
CERTIFICATE OF CORRECTION

PATENT NO. : 7,506,336 B1
APPLICATION NO. : 11/170026
DATED : March 17, 2009
INVENTOR(S) : Anoop George Ninan It is certified that error appears in the above-identified patent and that said Letters Patent is hereby corrected as shown below:

Claim 10, Column 12, Line 23, "in conjunction with server" should read "in conjunction with a server".

Signed and Sealed this

Twenty-first Day of April, 2009

JOHN DOLL
*Acting Director of the United States Patent and Trademark Office*